United States Patent
Nishimura

(10) Patent No.: US 9,658,519 B2
(45) Date of Patent: May 23, 2017

(54) PROJECTION DEVICE AND PROJECTION METHOD

(71) Applicant: Seiko Epson Corporation, Tokyo (JP)

(72) Inventor: Naoya Nishimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 14/566,482

(22) Filed: Dec. 10, 2014

(65) Prior Publication Data

US 2015/0168818 A1 Jun. 18, 2015

(30) Foreign Application Priority Data

Dec. 18, 2013 (JP) ................................. 2013-260966

(51) Int. Cl.
*G03B 21/14* (2006.01)
*G03B 21/26* (2006.01)
*G03B 21/28* (2006.01)

(52) U.S. Cl.
CPC ........... *G03B 21/142* (2013.01); *G03B 21/14* (2013.01); *G03B 21/26* (2013.01); *G03B 21/28* (2013.01); *G03B 2206/00* (2013.01)

(58) Field of Classification Search
CPC .. H04N 9/3147; H04N 9/3141; H04N 9/3173; H04N 9/3185; H04N 9/317; G03B 21/14; G03B 21/147; G03B 21/26; G03B 21/10; G03B 21/13
USPC .......................... 345/173–183; 353/121, 122
See application file for complete search history.

(56) References Cited

U.S. PATENT DOCUMENTS

| | | | | |
|---|---|---|---|---|
| 2008/0316438 A1* | 12/2008 | Midorikawa | .......... | G03B 21/28 353/70 |
| 2009/0207189 A1* | 8/2009 | Lin | ......................... | G06F 3/041 345/660 |
| 2012/0050302 A1* | 3/2012 | Dedeoglu | ............... | G06F 3/017 345/581 |
| 2013/0154985 A1* | 6/2013 | Miyazaki | .............. | G06F 3/0418 345/173 |
| 2015/0040074 A1* | 2/2015 | Hofmann | .............. | G06T 19/006 715/852 |
| 2015/0077642 A1* | 3/2015 | Nishimura | .............. | G03B 21/10 348/745 |
| 2015/0248480 A1* | 9/2015 | Miller | ............... | G06F 17/30864 707/723 |

FOREIGN PATENT DOCUMENTS

| | | |
|---|---|---|
| JP | 2004-187140 A | 7/2004 |
| JP | 2011-215441 A | 10/2011 |

* cited by examiner

*Primary Examiner* — William C Dowling
(74) *Attorney, Agent, or Firm* — ALG Intellectual Property, LLC

(57) ABSTRACT

A projector includes a projection section adapted to project an image on a white board, an imaging section adapted to take an image of the white board, and a control section adapted to set an imaging area representing a range, from which an image of an object attached to the white board is extracted, in accordance with a display state of the white board imaged by the imaging section, and then make an imaging area image indicating the imaging area be projected on the white board.

7 Claims, 5 Drawing Sheets

PROJECTION DEVICE AND PROJECTION METHOD

The entire disclosure of Japanese Patent Application No. 2013-260966, filed Dec. 18, 2013 is expressly incorporated by reference herein.

BACKGROUND

1. Technical Field

The present invention relates to a projection device and a projection method.

2. Related Art

In the past, as described in JP-A-2004-187140, there has been known a projection device incorporating an imaging device such as a digital camera, taking an image of a material mounted on a document holder using the imaging device, and then projecting the image thus taken on a projection surface.

In the case of attempting to project the material mounted on the document holder in an enlarged manner in such a projection device, it is necessary for the user to designate the area to be imaged. For example, the user designates the place to be magnified by disposing predetermined marks at two diagonal positions including a desired place.

However, in the case in which many materials are mounted on the document holder, or some information is handwritten on a board surface of the document holder with a predetermined pen or the like, it is required to change the mounting position of the materials or move the handwritten information to another area by transcription in order to distinguish the material to be projected in an enlarged manner from the rest of the materials, which requires a lot of time and toil. Further, in the case in which the size of the material to be projected is different, it is troublesome to perform the designation by moving the marks in each case.

SUMMARY

An advantage of some aspects of the invention is to provide a projection device making it possible to easily set the area of the document holder in which the material of the projection object is mounted and simply and easily designate the projection of the material.

The invention can be implemented as the following forms or application examples.

APPLICATION EXAMPLE 1

A projection device according to this application example includes a projection section adapted to project an image to display the image on a display surface, an imaging section adapted to take an image of the display surface, and a control section adapted to set a first area representing a range, from which an image of an object attached to the display surface is extracted, in accordance with a display state of the display surface imaged by the imaging section, and then make the projection section display an area image indicating the first area thus set on the display surface.

According to such a configuration, the first area representing the range from which the image of the object is extracted is set in accordance with the display state of the display surface imaged by the imaging section, and the area image indicating the first area thus set is displayed on the display surface by the projection section. Therefore, the area where the object should be attached for extracting the image of the object is clearly specified, and by attaching the object in the area specified clearly, the image of the object can easily be extracted.

APPLICATION EXAMPLE 2

In the projection device according to the application example described above, it is preferable that the control section sets a blank area, which exceeds a predetermined area in the display surface, and is close to the imaging section, as the first area.

According to such a configuration, since the blank area is set as the first area, an influence of the background area can be eliminated in the case of extracting the image of the object, and further, since the first area is close to the imaging section, the imaging length when imaging the first area becomes shorter, and thus, the degradation of the resolution of the image thus taken can be suppressed.

APPLICATION EXAMPLE 3

In the projection device according to the application example described above, it is preferable that there is further included a storage section adapted to store the image taken by the imaging section, and the control section compares a first image, which is an image of the first area taken by the imaging section, and a second image of the first area stored in the storage section with each other to detect whether the object is attached to the first area.

According to such a configuration, it is possible to detect the fact that the object is attached based on the comparison between the first image thus taken and the second image stored in the storage section.

APPLICATION EXAMPLE 4

In the projection device according to the application example described above, it is preferable that in the case in which the control section detects that the object has been attached to the first area, the control section extracts the image of the object from the first image based on a difference between the first image and the second image.

According to such a configuration, the image of the object can easily be extracted based on the difference between the first image and the second image.

APPLICATION EXAMPLE 5

In the projection device according to the application example described above, it is preferable that the control section generates a third image based on the object thus extracted, then displays the third image thus generated in a second area of the display surface so as to be able to be designated, and displays the image of the object in a third area in a case in which the third image is designated.

According to such a configuration, it is possible to give notice of the fact that the image of the object has successfully been extracted on the display surface using the third image, and then display the image of the object on the display surface by designating the third image.

APPLICATION EXAMPLE 6

In the projection device according to the application example described above, it is preferable that the area image is one of an image with the first area filled with a predetermined pattern, and an image with an outer frame of the first area drawn.

APPLICATION EXAMPLE 7

A projection method according to this application example includes taking an image of a display surface on which an image is displayed by projection, setting a first area representing a range, from which an image of an object attached in the display surface is extracted, in accordance with a display state of the display surface imaged in the taking of an image, and displaying an area image indicating the first area thus set on the display surface.

According to such a method, the first area representing the range from which the image of the object is extracted is set in accordance with the display state of the display surface imaged by the imaging section, and the area image indicating the first area thus set is displayed on the display surface from the projection section. Therefore, the area where the object should be attached for extracting the image of the object is clearly specified, and by attaching the object in the area specified clearly, the image of the object can easily be extracted.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
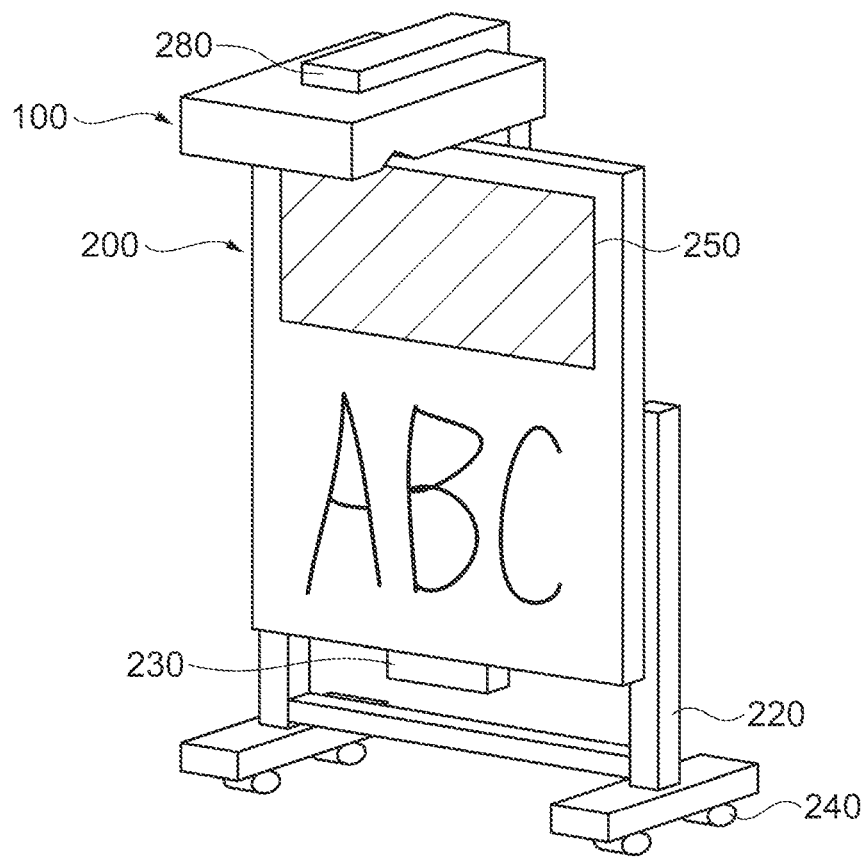
FIG. 1 is an appearance diagram showing a configuration of having a projector according to an embodiment of the invention and a white board integrated with each other.

An embodiment of the invention will hereinafter be explained with reference to the accompanying drawings.
Embodiment
FIG. 1 is an appearance diagram showing a configuration in which a projector 100 as a projection device and a white board 200, on which writing can be performed using an ink pen or the like, are integrated with each other via a supporting member 280 as a holding mechanism. The supporting member 280 is attached to an upper part of the white board 200, and the support member 280 holds the projector 100 so as to suspend the projector 100.

The projector 100 is provided with a function of projecting the light beam to be projected while making the light beam wide-angle using a reflecting mirror, and projects a projection image on one surface (a display surface) of the white board 200 in an enlarged manner. It should be noted that although in the first embodiment, there is assumed the configuration in which the projector 100 performs the projection from above the white board 200, the invention is not limited to this configuration. For example, there can also be assumed a configuration in which the projector 100 is fixed to a lower part of the white board 200, and performs the projection from below.

Further, although the white board 200 is disposed so as to have a rectangular shape longer in a vertical direction than in a horizontal direction in a front view, the shape is not particularly limited. For example, a rectangular shape longer in the horizontal direction than in the vertical direction can also be adopted, and a square shape equal in size in the vertical and horizontal directions can also be adopted.

The white board 200 is supported by a leg section 220, and casters 240 are disposed on a bottom surface of the leg section 220.

Further, an operation panel 230 for operating the projector 100 is disposed below the display surface of the white board 200, and it is possible for the user to make a desired image be projected on the display surface in an enlarged or contracted manner via operations from the operation panel 230. Further, in the case in which the user grips a predetermined electronic pen (not shown) to indicate a menu screen or the like projected on the white board 200 by the projector 100, it is possible for the projector 100 to recognize the indicated position by the electronic pen to perform an operation corresponding to the menu screen.

Further, on the display surface of the white board 200, there is displayed an imaging area image 250. It is possible for the user to make the projector 100 obtain a document or the like as image data by attaching the document or the like with a magnet or the like in the area displayed by imaging area image 250.

Figure 2:
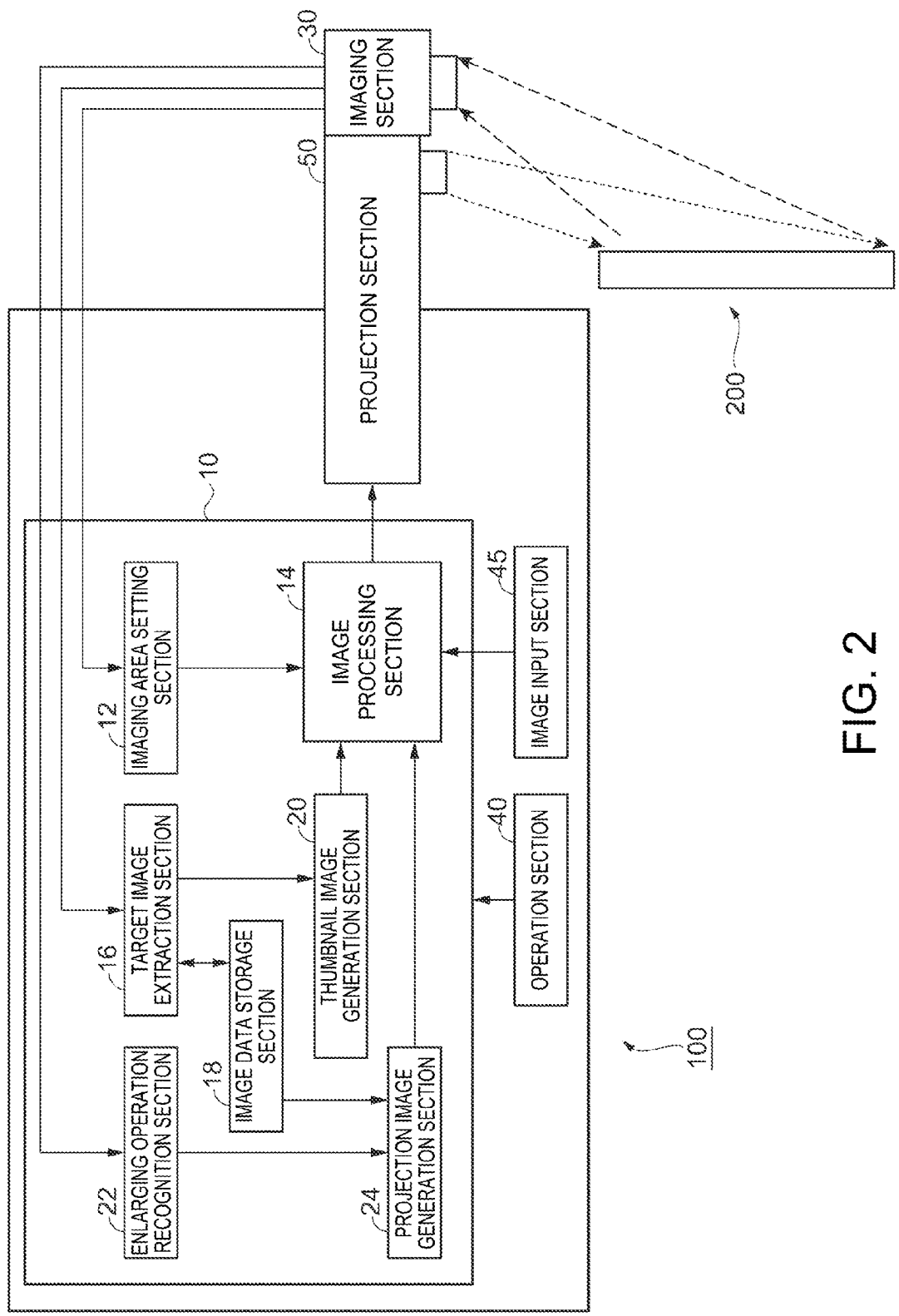
FIG. 2 is a block diagram showing a functional configuration of the projector.

FIG. 2 is a block diagram showing a functional configuration of the projector 100. The projector 100 is provided with a control section 10, an imaging section 30, an operation section 40, an image input section 45, and a projection section 50. Further, the control section 10 is provided with an imaging area setting section 12, an image processing section 14, a target image extraction section 16, an image data storage section 18, a thumbnail image generation section 20, an enlarging operation recognition section 22, and a projection image generation section 24.

The control section 10 controls an operation of the projector 100. A digital camera is assumed as the imaging section 30, which takes an image displayed on the display surface of the white board 200, an image of a document attached on the display surface, and an image of a character, a figure, and so on written on the display surface of the white board 200 by the user using the ink pen or the like, and then transmits the image data of the image thus taken to the control section 10.

The operation panel 230 is assumed as the operation section 40, to which a predetermined operation is instructed. Further, to the image input section 45, image data to be projected by the projection section 50 is input in a predetermined file format via a memory card (not shown) or communication.

The projection section 50 projects an image based on an image signal output from the image processing section 14 on the display surface of the white board 200 in an enlarged manner.

Then, functional sections of the control section 10 will be explained. The imaging area setting section 12 analyzes the image data of the image on the display surface of the white board 200 taken by the imaging section 30, and then sets an imaging area (a first area), which represents an extraction range of an object 260 (FIGS. 5A through 5E) attached to the white board 200, in accordance with the display state of the display surface. As an example, as the imaging area, there is set a blank area (a plain area) where no writing is provided to the white board 200 with the ink pen or the like, the area of which exceeds a predetermined area.

It should be noted that in the present embodiment, in the case in which the imaging area setting section 12 detects two or more areas which can be set as the imaging area, the imaging area setting section 12 determines the area having a shorter distance from the imaging section 30 as the imaging area in order to maintain the quality of the image data of the image thus taken.

Further, the imaging area setting section 12 generates the imaging area image 250 representing the imaging area thus set, and then transmits the image data of the imaging area image 250 thus generated to the image processing section 14 to be displayed on the white board 200. The imaging area image 250 can also have a configuration of performing the display by filling the corresponding range with a predetermined color or pattern, or a configuration of performing the display by drawing only the outer frame.

The target image extraction section 16 detects the fact that the object 260 (FIGS. 5A through 5E) is attached in the imaging area represented by the imaging area image 250, and then extracts the image of the object 260 in the case in which the fact has been detected. It should be noted that although an analog material such as an image including a figure, a photograph, or the like, or a material or a draft on which text information such as writing is written or printed is assumed as the object 260, the object 260 is not limited thereto.

In the present embodiment, the target image extraction section 16 instructs the imaging section 30 to take the imaging area image 250 at predetermined time intervals, obtains the image data of the image taken by the imaging section 30, and stores the image data in the image data storage section 18. Then, the target image extraction section 16 obtains the image of the object 260 attached in the imaging area by comparing the plurality of images different in imaging time from each other to extract the difference between the images. The image data of the object 260 thus obtained is stored in the image data storage section 18, and at the same time transmitted to the thumbnail image generation section 20.

The thumbnail image generation section 20 generates a thumbnail image 270 (FIGS. 5A through 5E) of the object 260 based on the image data of the object 260 transmitted from the target image extraction section 16, and then transmits the image data of the thumbnail image 270 thus generated to the image processing section 14 to display the result on the white board 200.

It should be noted that in the case in which a plurality of objects 260 is attached in the imaging area, it is also possible that the target image extraction section 16 individually extracts the objects 260, and the thumbnail image generation section 20 respectively generates the thumbnail images 270, or it is also possible that the target image extraction section 16 extracts the plurality of objects 260 as a single object 260, and the thumbnail image generation section 20 generates a single thumbnail image 270 including the plurality of objects 260.

The enlarging operation recognition section 22 recognizes an enlarging operation instruction by the user to the thumbnail image 270 displayed on the white board 200. In the present embodiment, there is assumed a configuration in which a predetermined operation is performed on the thumbnail image 270 with an electronic pen, and the enlarged display is instructed from the operation section 40. In the case in which the enlarging operation recognition section 22 has recognized the enlarging operation instruction, the enlarging operation recognition section 22 transmits the enlarged display instruction of the thumbnail image 270 to the projection image generation section 24.

The projection image generation section 24 reads out the image data of the object 260 corresponding to the thumbnail image 270 from the image data storage section 18 based on the enlarged display instruction transmitted from the enlarging operation recognition section 22, and then transmits the image data of the object 260 thus read out to the image processing section 14 to display the image of the object 260 on the white board 200 as a projection image 285 (FIGS. 5A through 5E) of the object.

The image processing section 14 performs image processing on each of the image data transmitted from the imaging area setting section 12, the thumbnail image generation section 20, and the projection image generation section 24, then generates an image signal which can be projected by the projection section 50, and then transmits the image signal thus generated to the projection section 50.

In the present embodiment, the image processing section 14 performs a resizing process, and at the same time, generates the image signal expressing each of the grayscales of R (red), G (green), and B (blue) using luminance values, and a luminance signal based on the image data input. Further, the image processing section 14 calculates a feature amount based on the luminance signal, an expansion process is performed on the image signal based on an expansion coefficient calculated from the feature amount thus calculated, and then the image signal on which the expansion process has been performed is transmitted respectively to liquid crystal devices 85R, 85G, and 85B (FIG. 3) of the projection section 50.

It should be noted that the control section 10 is provided with a central processing unit (CPU), a read only memory (ROM), a random access memory (RAM), and so on, none of them shown, as hardware. The CPU is a central processing device for performing a variety of arithmetic processing, and performs input and output of signals with each of the sections to thereby integrally control the projector 100. The ROM stores a control program and control data used by the CPU for performing the variety of arithmetic processing. The control program includes an image processing program used in the image processing section 14. Further, the ROM also stores a variety of programs and so on. The RAM is used as the working area when the CPU performs the variety of arithmetic processing.

The functions of the respective functional sections of the control section 10 described above are realized by the hardware and the programs working together with each other.

Figure 3:
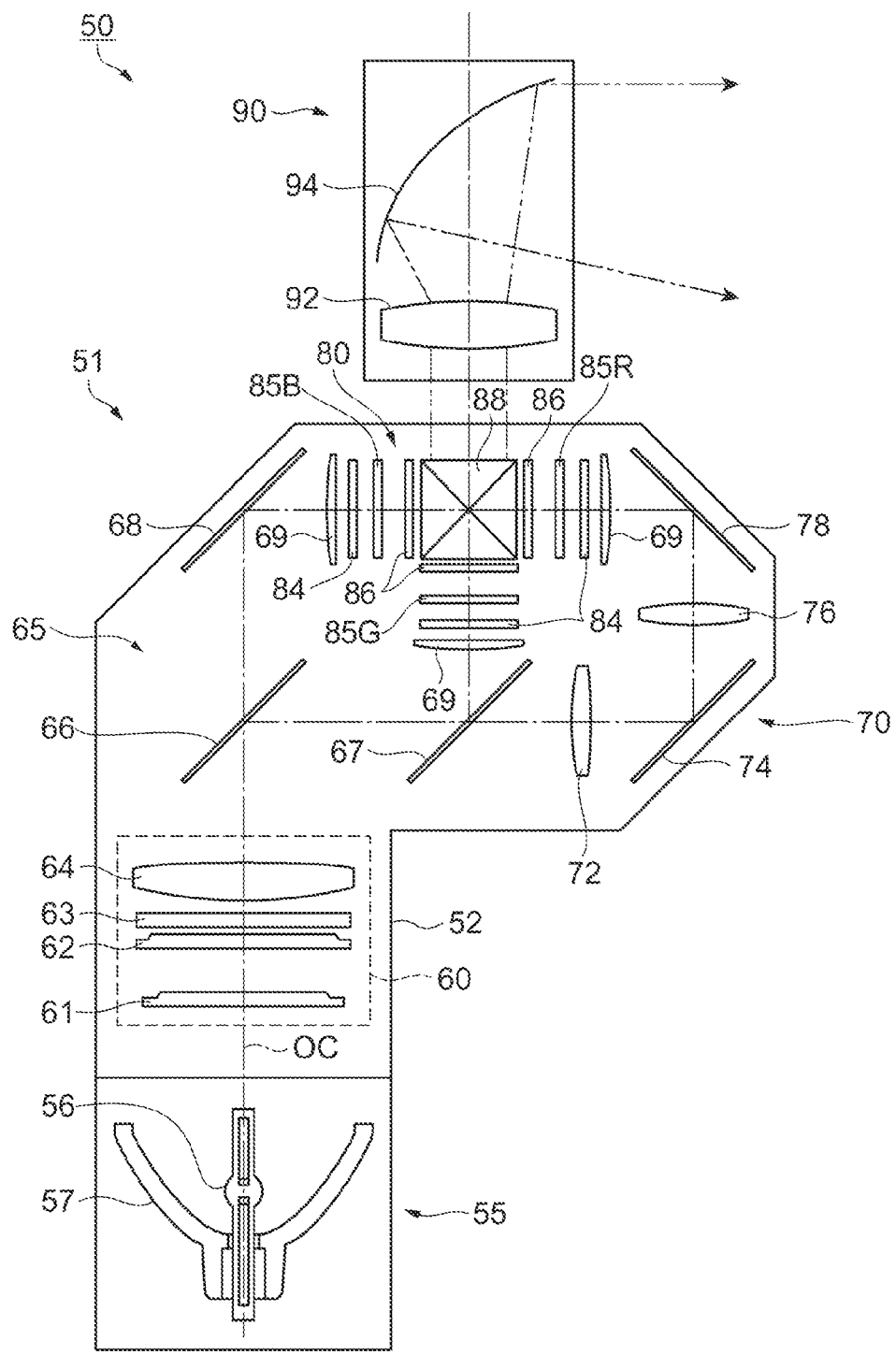
FIG. 3 is a diagram schematically showing an optical system of a projection section.

FIG. 3 is a diagram schematically showing an optical system of the projection section 50. The schematic configuration of the optical system will be explained with reference to FIG. 3.

The optical system of the projection section 50 is configured including an optical unit 51. The optical unit 51 is provided with an optical component housing 52, a light source device 55, an illumination optical device 60, a color separation optical device 65, a relay optical device 70, a light modulation device 80, and a projection optical device 90. The optical components constituting each of these devices are housed in the optical component housing 52.

The light source device 55 is provided with a light emitting tube 56 for emitting a light beam and a reflector 57. The light source device 55 reflects the light beam emitted from the light emitting tube 56 with the reflector 57 to align the emission direction, and then emits the light beam toward the illumination optical device 60. It should be noted that an illumination light axis OC corresponds to the center axis of the light beam emitted from the light source device 55 toward an illuminated area. It should be noted that a solid-state light source such as an LED or a laser can also be assumed as the light source.

The illumination optical device 60 is provided with lens arrays 61, 62, a polarization conversion element 63, an overlapping lens 64, and a field lens 69, and has a function of homogenizing the illuminance in a plane perpendicular to the illumination light axis OC with respect to the light beam emitted from the light source device 55.

The color separation optical device 65 is provided with dichroic mirrors 66, 67 and a reflecting mirror 68, and separates the light beam emitted from the illumination optical device 60 into three colored light beams, namely a red (R) light beam, a green (G) light beam, and a blue (B) light beam, and then guides the three colored light beams to three liquid crystal devices 85R, 85G, and 85B, respectively.

The relay optical device 70 is provided with an incident side lens 72, a relay lens 76, and reflecting mirrors 74, 78. The relay optical device 70 guides the colored light beam (the R light beam in the present embodiment) separated by the color separation optical device 65 to the liquid crystal device 85 (the liquid crystal device 85R in the present embodiment) while preventing the degradation of the light efficiency due to the diffusion of the light caused by the fact that the length of the light path of the colored light beam separated by the color separation optical device 65 becomes longer than the lengths of the light paths of other light beams.

The light modulation device 80 is provided with three incident side polarization plates 84, the three liquid crystal devices 85R, 85G, and 85B, three exit side polarization plates 86, and a cross dichroic prism 88. The liquid crystal devices 85R, 85G, and 85B modulate the respective colored light beams, which are separated by the color separation optical device 65, in accordance with the image signal. The cross dichroic prism 88 combines the colored light beams respectively modulated by the liquid crystal devices 85R, 85G, and 85B, and then emits the result toward the projection optical device 90. It should be noted that a modulation method using a digital mirror device (DMD) can also be assumed as the light modulation device 80.

The projection optical device 90 is provided with an ultra short focus projection lens 92 and a reflecting mirror 94 having a curved surface. The projection optical device 90 enlarges the light beam, which has been modulated and then combined in the light modulation device 80, with the projection lens 92, then reflects the result with the reflecting mirror 94 to thereby project the result in an enlarged manner toward the display surface of the white board 200, and thus, the image based on the image signal is displayed on the display surface.

Figure 4:
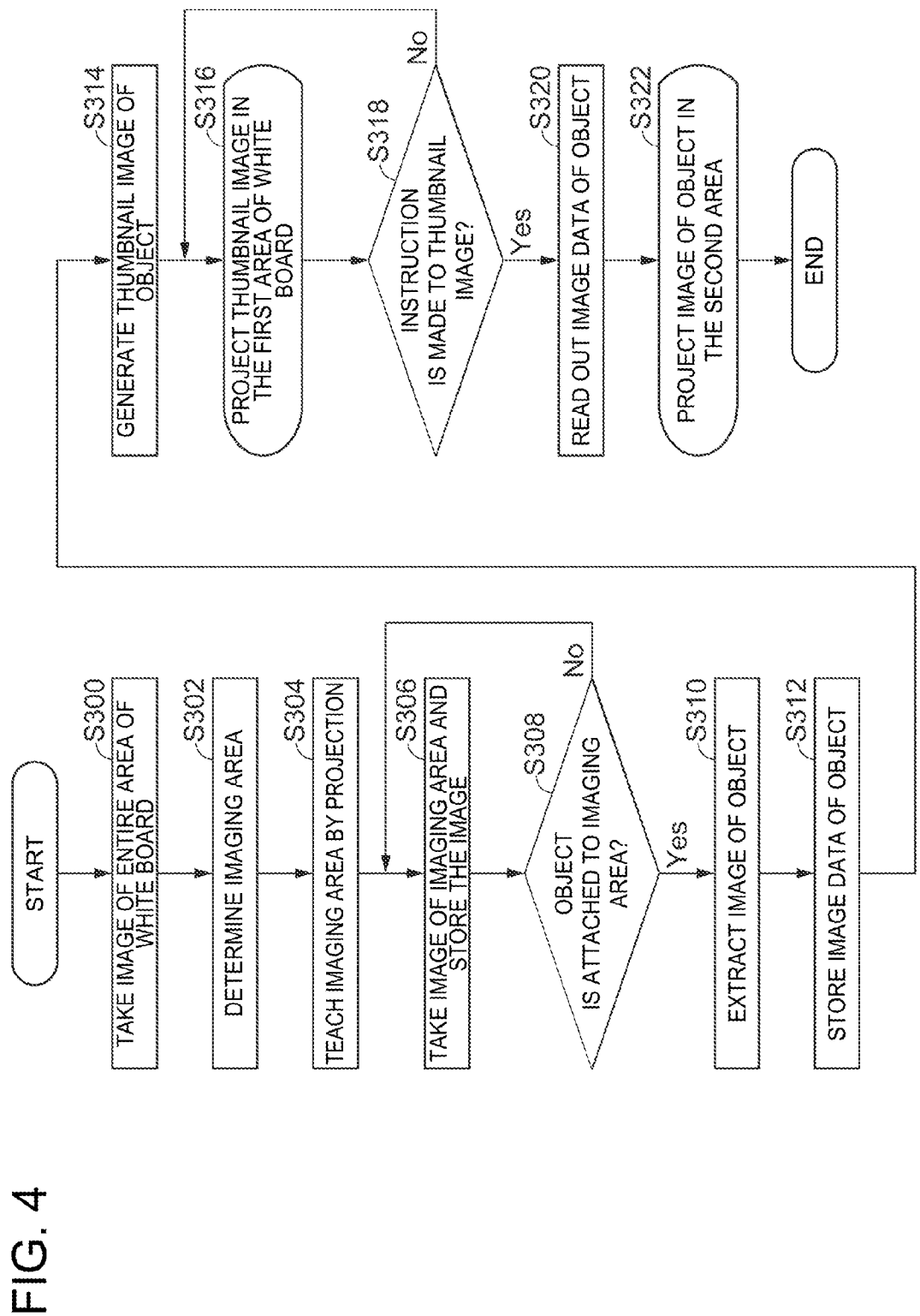
FIG. 4 is a flowchart showing a projection process.

Then, FIG. 4 is a flowchart showing a projection process (a projection method) for projecting the image of the object 260 attached on the white board 200, and the explanation will be presented with reference also to the diagrams showing transitions in the white board 200 shown in FIGS. 5A through 5E.

Figure 5E:
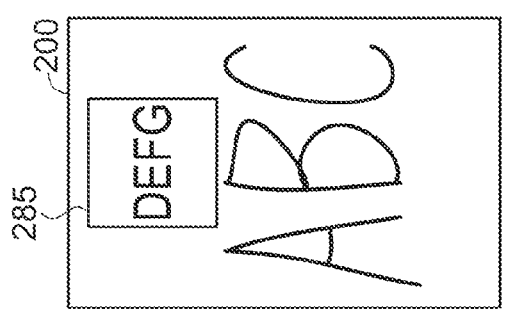
FIGS. 5A through 5E are diagrams showing transition of a display state of the white board.
Figure 5D:
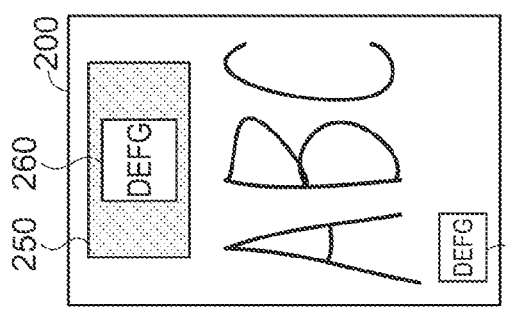
Figure 5C:
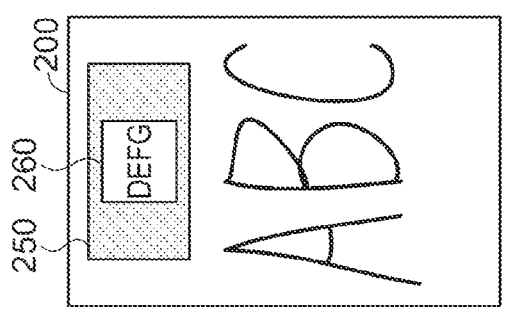
Figure 5B:
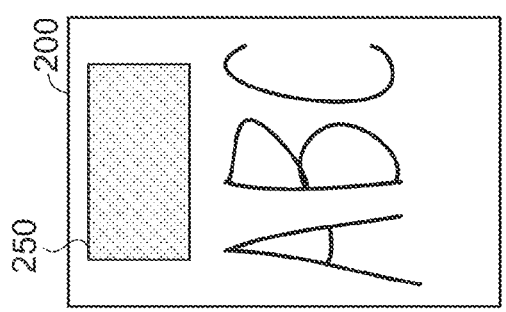
Figure 5A:
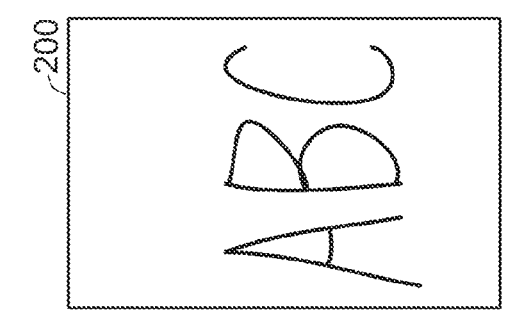

For example, as shown in FIG. 5A, there is assumed a state in which characters are handwritten in a roughly central portion of the white board 200. The user operates the operation section 40 to start the projection process.

When the projection process is started, the control section 10 makes the imaging section 30 take (step S300) the image of the entire area of the display surface of the white board 200 <imaging process>.

Then, the control section 10 determines (step S302) the imaging area based on the image data of the image of the display surface taken by the imaging section 30 <setting process>. For example, in the case shown in FIG. 5A, the control section 10 determines the imaging area above the white board 200 as a place near to the imaging section 30, and where the area of the blank area exceeds a predetermined reference area.

Then, as shown in FIG. 5B, the control section 10 projects the imaging area image 250 representing the imaging area to the white board 200 to thereby teach (step S304) the imaging area to the user <area projection process>. It should be noted that the determination of the imaging area can be reperformed by the user operating the operation section 40. Therefore, in the case in which it is unachievable for the user to obtain the desired imaging area, it is also possible for the user to instruct redetermination of the imaging area after reallocating the blank area of the display surface. Further, there can be assumed a configuration in which the user designates the position and the size of the imaging area via the operation of the operation section 40, the electronic pen, and so on.

Subsequently, the control section 10 makes the imaging section 30 take an image of the imaging area, and then stores (step S306) the image thus taken. It should be noted that the imaging of the imaging area can also be automatically started after the imaging area has been determined, or can also be started by the user performing a predetermined operation from the operation section 40.

Then, the control section 10 compares the plurality of images different in imaging time from each other among the images stored to determine (step S308) whether or not the object 260 has been attached in the imaging area.

Here, in the case in which there is no change in the state in the imaging area between the plurality of images, and therefore it is determined that the object 260 is not attached (No in the step S308), the process returns to the step S306.

On the other hand, in the case in which the state of the display surface has made a transition from FIG. 5B to FIG. 5C, and a change in the state in the imaging area has occurred, it is determined that the object 260 has been attached (Yes in the step S308), the control section 10 extracts (step S310) the image of the object 260 from the difference between the image (a second image) before the change and the image (a first image) after the change.

Then, the control section 10 stores (step S312) the image of the object 260 thus extracted, and then generates (step S314) thumbnail image 270 (a third image) of the object 260 thus extracted.

Then, the control section 10 displays (step S316) the thumbnail image 270 thus generated in the second area of the white board 200 by projection. It should be noted that although in the present embodiment, the blank area in the lower part of the white board 200 is determined as the second area as shown in FIG. 5D, the invention is not limited to this configuration.

Further, the thumbnail image 270 is a symbol image representing the fact that the digital image of the object 260 has been generated, and is displayed so as to be able to be designated by the user. It should be noted that the invention is not limited to the thumbnail type, but a predetermined symbol mark or text information can also be adopted.

Then, the control section 10 determines (step S318) whether or not the enlarged display has been instructed by the user with respect to the thumbnail image 270 thus displayed.

Here, in the case in which it is determined that the enlarged display has not been instructed by the user (No in the step S318), the process returns to the step S316.

On the other hand, in the case in which it is determined that the enlarged display has been instructed by the user (Yes in the step S318), the control section 10 reads out (step S320) the image data of the object 260 corresponding to the thumbnail image 270.

Then, the control section 10 projects (step S322) the projection image 285 of the object 260 based on the image data thus read out in the third area of the white board 200 in an enlarged manner, and then terminates the series of processes. It should be noted that although in the present embodiment, there is assumed the configuration in which the area where the imaging area image 250 has been displayed is set to the third area, and the projection image 285 of the object 260 is displayed there instead of the display of the imaging area image 250 as shown in FIG. 5E, the invention is not limited to this configuration. For example, it is also possible to assume the configuration in which the user designates the position of the third area and the size of the projection image 285 via the operation of the operation section 40.

According to the embodiment described hereinabove, the following advantages can be obtained.

(1) Since the projector 100 searches the display surface of the white board 200 for the blank area to determine the area suitable for the imaging area, and then teaches the result to the user, the trouble for the user to determine the imaging area and then notify the projector 100 of the result becomes unnecessary, and therefore, speeding-up of the acquisition of the image of the object 260 can be achieved.

(2) Since the digital image of the object 260 is generated automatically when attaching the object 260 in the area indicated by the imaging area image 250, it becomes unnecessary for the user to perform setting of a marker or the like for clearly specifying the object 260, and the user can be devoted to other operations such as a presentation using the projection image 285.

The device for achieving the method described above can be realized by a single device in some cases, or can also be realized by combining a plurality of devices, and therefore, a variety of configurations are included. For example, the projector 100 is not limited to the configuration having the control section 10, the projection section 50, and the imaging section 30 integrated with each other, but there can be assumed a configuration having each of the sections disposed in a separate state.

Further, there can also be assumed a configuration in which the display surface is disposed in parallel to the floor, and the projection is performed downward from the projector 100 installed on the upper side. In this case, the display surface is not limited to the white board 200, but can also be a document holder on which an image can be projected.

Further, the invention is not limited to the white board 200, but there can also be assumed a configuration of so-called rear projection in which the projector 100 performs the projection using a rear side of a transmissive board as the display surface.

Each of the constituents and the combinations of the constituents in the embodiment are illustrative only, and addition, omission, and substitution of a constituent, and other modifications can be provided within the scope or the spirit of the invention. Further, the invention is not limited by the embodiment, but is only limited by the appended claims.

What is claimed is:

1. A projection device comprising:
    a projection section adapted to project an image on a display surface;
    an imaging section adapted to take an image of the display surface; and
    a control section adapted to:
        set a first area representing a portion of the display surface from which an image of an object attached to the display surface is to be extracted, the first area being set based on a display state of the display surface imaged by the imaging section, and
        direct the projection section to display, on the display surface, an area image indicating to a user a position of the first area set by the control section.

2. The projection device according to claim 1, wherein the control section sets, as the first area, a blank area on the display surface that exceeds a predetermined size on the display surface, and that is closer to the imaging section than an additional blank area on the display surface.

3. The projection device according to claim 1, further comprising:
    a storage section adapted to store the image taken by the imaging section,
    wherein the control section is further adapted to compare a first image, which is an image of the first area taken by the imaging section, with a second image of the first area stored in the storage section to detect whether the object is attached to the first area.

4. The projection device according to claim 3, wherein in a case in which the control section detects that the object has been attached to the first area, the control section is further adapted to extract the image of the object from the first image based on a difference between the first image and the second image.

5. The projection device according to claim 4, wherein the control section is further adapted to:
    generate a third image based on the extracted image of the object,
    direct the projection section to display the third image in a second area of the display surface such that the third image can be selected by the user, and
    direct the projection section to display the image of the object in a third area on the display surface based on a user selection of the third image displayed in the second area.

6. The projection device according to claim 1, wherein the area image is one of an image in which the first area is filled with a predetermined pattern and an image in which an outer frame defines the first area.

7. A projection method comprising:
    taking an image of a display surface on which an image is displayed by projection;
    setting a first area representing a portion of the display surface from which an image of an object attached in the display surface is to be extracted, the first area being set based on a display state of the display surface imaged in the taking of the image; and
    displaying an area image that indicates to a user a position of the first area on the display surface.

* * * * *